United States Patent [19]

Butcher et al.

[11] Patent Number: 4,878,425

[45] Date of Patent: Nov. 7, 1989

[54] APPARATUS FOR PREPARATION OF CONFECTION PRODUCTS

[75] Inventors: Ian Butcher, Harrow; Gordon S. Carrick, Stroud; Kevin P. Hillman, Bishops Cleeve, all of England

[73] Assignee: Thomas J. Lipton Inc., Englewood, N.J.

[21] Appl. No.: 9,603

[22] Filed: Jan. 20, 1987

Related U.S. Application Data

[60] Continuation of Ser. No. 753,680, Jul. 10, 1985, abandoned, which is a division of Ser. No. 411,185, Aug. 25, 1982, Pat. No. 4,542,028.

[30] Foreign Application Priority Data

Aug. 26, 1981 [GB] United Kingdom ............... 8125970
Apr. 16, 1982 [GB] United Kingdom ............... 8211182

[51] Int. Cl.⁴ .................... A23G 9/00; A23P 1/00; B29F 3/04
[52] U.S. Cl. ................... 99/450.2; 99/450.1; 425/131.1; 425/380; 425/382 R
[58] Field of Search .............. 426/100, 101, 565–567; 99/450.1, 450.2, 450.4, 450.7; 425/131.1, 202, 382 R; 264/171; 239/566, 567, 587; 118/13, 16, 24

[56] References Cited

U.S. PATENT DOCUMENTS 2,998,934 9/1961 Broughton ..................... 99/516 X

Primary Examiner—Timothy F. Simone
Attorney, Agent, or Firm—Brumbaugh, Graves, Donohue & Raymond

[57] ABSTRACT

An apparatus for producing a novel extruded composite confection product comprising slotted extrusion means arranged to extrude in succession at least four thin superimposed layers of a first confection material having a thickness of less than 5 mm. The apparatus further contains a take-off conveyor arranged to receive the output of the slotted extrusion means and spray nozzles arranged for spraying a second confection material between successive extruded layers of the first confection material.

4 Claims, 2 Drawing Sheets

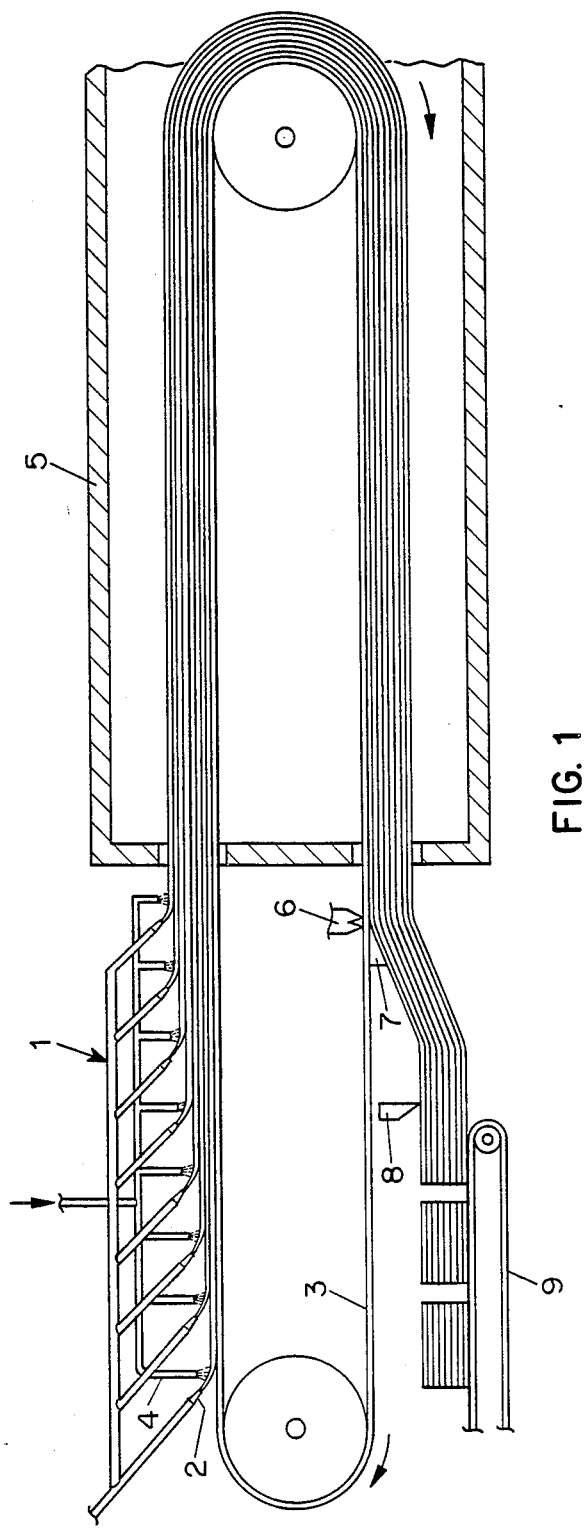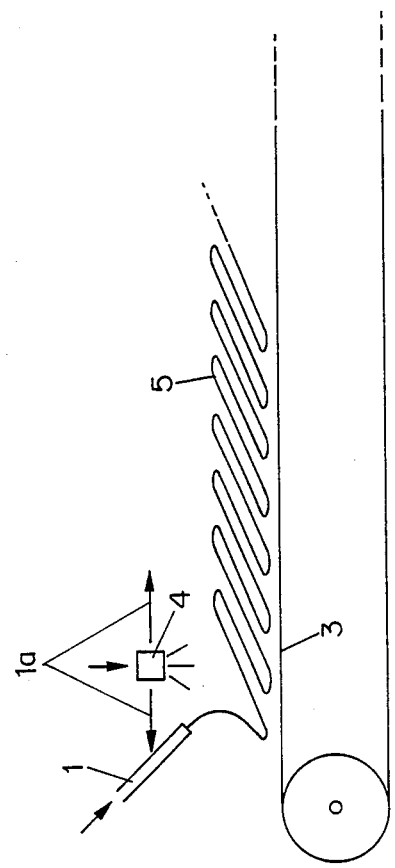

APPARATUS FOR PREPARATION OF CONFECTION PRODUCTS

This application is a continuation of application Ser. No. 753,680, filed on July 10, 1985, abandoned, which was a division of application Ser. No. 411,185, filed on Aug. 23, 1982, U.S. Pat. No. 4,542,028.

This invention relates to confection products, and to processes and apparatus for their preparation. In particular, the invention is applicable for example to ice confections and their preparation.

A large number of industrially-applicable methods for preparing ice confections is known, including various forms of extrusion device for ice cream and confections of similar texture: see for example U.S. Pat. No. 4,020,643, (Lipton).

Ice cream neapolitans and spumonis represent commonly-used multilayer technique, in each case with thick layers. Japanese Specification No. 20065/1966 (Morinaga) describes another such 2-layer ice confection, which also has a confection filling and chocolate coating. Ice cream sandwiches with biscuit components are also known (e.g. GB No. 1,219,593, Eskimo Pie Corporation).

It is the purpose of many of the known methods to produce ice confections with decorated shapes and textures: nevertheless the range of shapes and textures accessible to the known techniques is limited, and it is the object of the present invention to provide products and corresponding apparatus and methods of novel structure and texture.

We have also surprisingly found it possible to extrude very thin layers of extrudable foodstuffs such as aerated frozen confections.

Accordingly, the present invention provides a composite confection product, comprising a multiplicity (for example, at least four) superimposed extruded layers of extrudable confection material, preferably each layer less than about 5 mm in thickness. Very suitably, the confection material can for example be aerated frozen confection, such as ice cream. It is preferred to interleave very thin layers, e.g. less than about 1 mm thick, of a second confection material between the extruded layers of (e.g. frozen) confection. These interleaved layers can be sprayed on, and can for example be of fat-based confection material, such as a sprayed couverture. The interleaved layers can be sufficiently thin that they are at least partly discontinuous. In certain attractive embodiments of the invention, a core or substrate of other confection material can be enrobed or covered with the multiplicity of thin extruded confection layers: the core can be other than flat, and a contoured product can accordingly result.

Processes according to the invention comprise extruding confection material such as aerated frozen confection material as a multiplicity of superimposed thin layers onto a take-off conveyor. This can be done using a succession of aligned slotted extrusion outlets, and/or by successive relative forward and backward passages of a slotted extrusion outlet with respect to a substrate.

Apparatus according to the invention comprises a take-off conveyor arranged to receive the output of slotted extrusion means for producing a multiplicity of thin superimposed layers of extrudable confection material.

In certain embodiments, a slotted extrusion outlet can be arranged for successive forward and backward passages with respect to the take-off conveyor, which possibly carries another substrate such as a sequence of trass for the product. According to the invention there is also provided an apparatus suitable for making confection products, especially ice confection products, which comprises a plurality of extrusion nozzles (e.g. thin slot-shaped extrusion nozzles) arranged for extruding an extrudable confection material in successive (preferably thin) layers on to a takeoff conveyor line or other moving substrate, and which is optionally also provided, either between extrusion nozzles or in succession to each extrusion nozzle confection spray outlets (or other feed outlets) arranged for spraying or feeding a second confection material on to the corresponding extruded layer of confection material on the takeoff conveyor before it is covered by a succeeding extruded layer.

In operation, according to one example of a process according to the invention, extrusion of an extrudable confection such as an ice confection on to the takeoff conveyor is carried out by successively extruding and laying down layers (usually less than about 5 mm thick) of the confection on to the takeoff conveyor or on to the uppermost layer of confection product already laid down, generally in the direction of motion of the substrate, and preferably spraying each layer of confection with a second confection material before it is covered with a further layer of extruded confection.

The corresponding product of the invention is a composite confection product comprising a plurality of (preferably thin) layers of extruded confection material, (preferably thin) layers of extruded confection material, usually including ice confection material, and optionally interleaved by layers of (preferably sprayed) second confection material. Also provided by the invention is a product of this type which has been formed on a tray, e.g. as described in more detail below. Certain examples of the products have some or all of the thin extruded layers formed with decorative pattern. Clearly, any number of different kinds of confection, colour or flavour varieties can be used for the different layers.

In preferred embodiments of the invention, the extrusion is of ice cream or other ice confection from an extrusion manifold to be described in detail below, and the intermediate sprayed layers of second confection material can be for example sprayed chocolate or other fatty couverture material sprayed from successive spray nozzles arranged between the extrusion outlets of the extrusion manifold.

Also, in certain preferred embodiments of the invention, the extrusions are laid down on to a sequence of trays passing along the conveyor, e.g. end-to-end, and the manufacture of the final product comprises cutting the extruded layered products between the trays, separating the trays containing the layered products, e.g. on a faster-moving conveyor, freezing/hardening the products and wrapping them.

Manufacture of the ice confection products can alternatively be completed by passing the continuously-extruded product on the takeoff conveyor in known manner through a hardening-freezing tunnel, then surface-heating the conveyor belt to release the adherent frozen product, and cutting and wrapping the continuously-formed hardened frozen product.

The conditions of formulation and temperatures, etc, used for the components of the products made as described herein, are not unduly critical and any of a wide range of conditions known in themselves can be used, e.g., ice cream of normal formulation can conveniently be extruded at −4° to −5° C.

The number of layers of the extruded product, and corresponding number of extrusion outlets in the manifold, is not critical, and can be e.g. 4–20, e.g. 8–12.

It is important that the individual extrusion outlets should be adjusted in height above the substrate on to which each extrudes its product, i.e. for the first extrusion outlet the substrate is usually the conveyor belt or tray etc thereon, and for each subsequent outlet the substrate is the product of the preceding parts of the apparatus. The adjustment in height should provide for a small drop distance for the extrudate on to the substrate, insufficient to cause excessive distortion or narrowing of the extruded band but enough to give reliable clearance: for standard ice cream about 15 mm is suitable. By way of specific example in the case that the individual extrudates are about 2 mm thick, the first nozzle can be arranged to give 2–5 mm, e.g. about 2–4 mm, clearance of the belt or conveyor arrangements, and the remaining nozzles can be offset in height by 2–4 mm each. It is desirable to allow for adjustment of the clearances in operation both to ensure fine control of the product form and to produce decorative effects where desired. Such adjustment can be provided by any convenient mechanical arrangement, in itself conventional, such as adjustable telescopic or flexible tube fittings. Usually therefore, as a broad guide it can be said that the successive extrusion nozzles are upwardly stepped in height above the level of the first substrate by steps generally corresponding to the order of magnitude of the thickness of the successive layers.

An important series of examples of processes and products according to the present invention is made up of those in which some or all of the successive extruded layers are not flat. This can be achieved either by extruding the materials on to a non-flat substrate (e.g. a product of a different type, or else a suitably-formed tray, or by extruding a series of layers of different size and/or shape. For example, using process and apparatus according to an embodiment of this invention, it is possible to simulate in confectionery produced entirely automatically a half-log of wood showing a well-defined ring structure. For this purpose an initial small circular or semi-circular core of extruded material can be laid down on the substrate (e.g. trays or conveyor) in known manner, and successive alternate sprayed and extruded layers can then be added using the technique described in detail herein, subject to the modification that the first extruded layer has a suitable width adjusted to overlap the top and sides of the core, and therefore, as it descends from the slot-shaped extrusion nozzle, it wraps around the core to form a half-ring structure. Following a sprayed couverture layer, successive slot-shaped extrusion nozzles are arranged each with successively slightly larger widths in order to extrude an outer series of half-rings on to the preformed parts of the product. In this embodiment, as also in the others, the slot-shaped extrusion nozzles need not be flat but can be adapted to the shape of the layer to be extruded to a greater or lesser extent.

BRIEF DESCRIPTION OF THE DRAWINGS

FIG. 1 shows an embodiment of the device utilizing slit-shaped extrusion nozzles with alternating spray outlets, take-off conveyor, freezing apparatus and cutting device.

FIG. 3 shows an alternative embodiment of the apparatus containing a reciprocating slotted extrusion outlet and spray device.

The accompanying diagrammatic sectional drawings, FIGS. 1, 2, 2a and 3, and following description show embodiments of the invention given by way of example only. Referring to FIG. 1 of the drawings, there is shown an extrusion manifold 1 for ice confection comprising 8 slit-shaped extrusion nozzles such as 2 each with an opening of approximately 75 mm by 3 mm in rectangular cross-section. The first nozzle is arranged approximately 14 mm above a takeoff conveyor belt 3, and the succeeding nozzles are stepped upwardly by about 3 mm higher each time. The nozzles are connected to inlet supply lines from an ice cream or other ice confection freezer, and each nozzle has associated flow adjustment means (not shown in detail) so that the extrusion rates through the different nozzles can be adjusted for equal rates, or for rates in any other desired proportions. (In alternative embodiments, not all the nozzles need be fed from the same ice cream freezer supply line, so that multilayer products with different compositions in the different layers can be made, e.g. ice confections of different flavours and/or colours).

Figure 2:
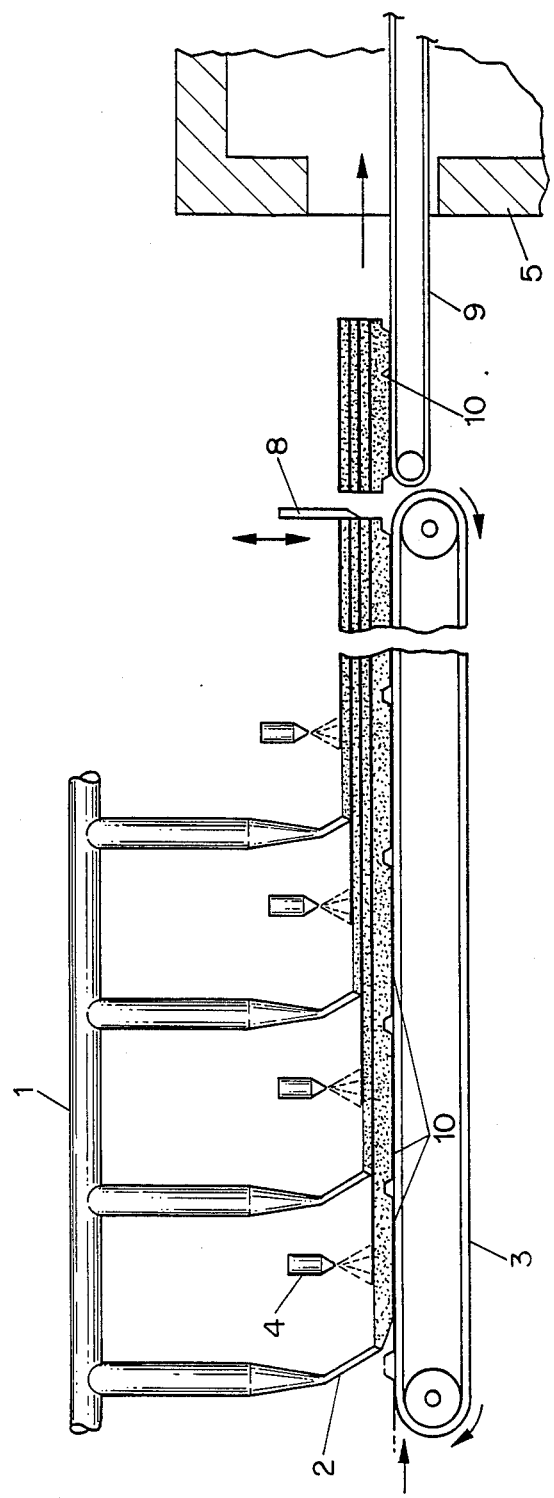
FIG. 2 shows another embodiment of the apparatus with stepped extrusion nozzles, alternating spray outlets, take-off conveyor and cutting device.

In the embodiment shown, the nozzles are spaced apart by about 25 cm, and in between each pair of nozzles there is provided a spray outlet such as 4 fed from a spray manifold for spraying chocolate or other (e.g. fat-based) confection material on to the extruded ice confection ribbon or layer laid down by the preceding nozzle.

As shown in the drawing the takeoff conveyor belt 3 is part of an endless stainless steel belt passing through a freezing/hardening tunnel 5, and a heater 6, scraper 7 and cutter 8 are provided for detaching and cutting the layered product manufactured by the earlier part of the apparatus, which is then removed for packing by a transfer conveyor 9.

In operation, the conveyor belt travels at about 0.7 m/minute, and a standard ice confection is extruded in practice as stiff as possible e.g. at −5° to −6° C. and at about 35 kg/hr through each nozzle. At an overrun which can suitably be 100%, this produces a multilayered product 5–10 cm wide and about 2.4 cm thick composed of 8 layers each about 3 mm thick. The intermediate chocolate couverture spray nozzles are each arranged to spray at a rate of about 7 kg/hr so that a very thin layer is formed, (which may be in part discontinuous), between each pair of the extruded ice confection layers.

Figure 2A:
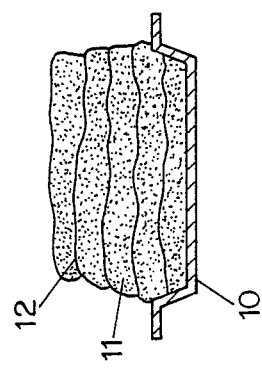
FIG. 2a shows the novel composite confection product.

FIG. 2 of the drawings diagrammatically shows an alternative arrangement of apparatus according to the invention comprising stepped extrusion manifold 1, (preferably stainless steel), nozzles 2, conveyor 3, confection sprayers 4, freezing tunnel 5, cutter 8, and take-off conveyor 9, here subject to modifications. The extrusion is not directly on to the conveyor 3, but instead on to a succession of shallow trays 10, e.g. plastics thermoformed trays, with peripheral lip of approximately 2 mm in height. These trays can for example have peripheral flanges by which they are positively located in a conveyor channel or line: they can be propelled down the line by any suitable cams or carriers. The cutter 8 operates at the end of the extrusion/spraying line and immediately after cutting the (as yet unhardened) products are separated from each other and taken away through the freezing tunnel 5 by the transfer conveyor 9. The discontinuity shown in FIG. 2 in the manifold 1, conveyor 3, and product thereon indicates that within reason the manifold, conveyor, and spray arrangements can be extended to as many extrusion units as desired. Four extruded layers and sprayed coverings only are shown in the product indicated in FIG. 2 but it will be appreciated that the number corresponds with the number of extrusion nozzles and spray stations. FIG. 2a shows in cross-section a product including five each of extruded layers 11 and sprayed layers 12 of a product on a tray 10. Decoration and finishing, e.g. cream, nuts, fruit or other topping can of course be applied to the products as desired, either on top of all the layers or as intermediate fillings and interlayers.

There is no need to control the process so that the product is precisely uniform: indeed one advantage of the described multilayer product and process is that the process variables can easily introduce a periodic or other non-uniformity in the product which adds to its attractiveness for the consumer.

It is clear that the invention may be made the subject of a number of modifications and variations: for example, whipped cream, mousse, marshmallow, biscuit crumb/fat mixtures, aerated cheesecake, or other non-frozen extrudable foodstuff can be extruded through the outlets of the manifold to make a multilayer extrudate, or alternated with ice cream layers, and other materials instead of fatty convertures, e.g. fat or water based sauces or creams such as sugar/fat/dairy confections, including fondant, peanut butter, acid fruit sauces, jam or honey, can be sprayed, extruded, fed or scattered by the intermediate spray devices, where these are fitted.

In particular, in one development of the arrangement shown in FIG. 2, twelve (or so) thin layers of ice cream or other ice confection are extruded successively on top of each other by an arrangement in which three sets of four extrusion nozzles are each fed from a manifold supplied by an ice confection supply line. This arrangement is preferred to a single manifold because it makes it easier to equalise or otherwise adjust the extrusion rates from each nozzle, an adjustment which is performed by any desired form of clip or flow control valve inserted between the manifold and the nozzle. The three sets of nozzles are arranged side-by-side along the length of the continuously-moving conveyor, and stepped as described above. The width and thickness of the individual slot-nozzles is also arranged as already described.

Intermediate chocolate spray devices take the form of successive compressed-air type spray guns fed with compressed air and chocolate or vegetable-fat-based couverture at about 40° C.–45° C.: the sprays are also fed from one or more couverture supply manifolds with flow adjustment means of any desired kind, and preferably are arranged to deliver a relatively thin near-laminar fan-shaped spray vertically down on to the product line, depositing the spray in a lane somewhat less wide than the product width.

The remaining steps in this development of the process can be carried out as described above (especially as in thermoformed) plastics trays can be packed in any desired manner, but with particular advantage and convenience in gussetted waxed-paper bags and cardboard packaging outers, alternatively in plastics "bubble packs" or in paper, plastics or foil "pillow" packages wrapped and sealed around the product in a manner which in itself is well known.

FIG. 3 shows in diagrammatic section an alternative device for producing products as described hereinabove. A slotted extrusion outlet 1 is movable in reciprocating motion indicated in direction by arrows 1a above and in the line of motion of a conveyor belt 3, (optionally carrying a sequence of trays as in FIG. 2). Mounted in advance of the slotted outlet 1 is a spray device 4 for fat-based couverture. The arrangement is such that the lateral reciprocating motion of outlet 1 causes the extruded thin layer to be laid down as an overlapping multiplicity of extruded thin layers 5, and the spray device 4 is arranged for intermittent operation to cover freshly-laid layers with a very thin layer of fat based couverture. Other features of the handling can be arranged as described in connection with the other embodiments of the invention.

It can be seen that any of the several features described herein can be combined and modified by the user within the scope of the invention.

We claim:

1. Apparatus for producing an extruded composite frozen confection product comprising slotted extrusion means arranged to extrude in succession at least four thin superimposed layers of a first confection material having a thickness of less than about 5 mm, a take-off conveyor arranged to receive the output of the slotted extrusion means and spray nozzles arranged for spraying a second confection material between successive extruded layers of the first confection material.

2. Apparatus according to claim 1, wherein said slotted extrusion means includes a plurality of aligned slotted extrusion outlets arranged above successive points of the take-off conveyor at successively greater heights along the length of the conveyor.

3. Apparatus according to claim 1, wherein said slotted extrusion means is arranged for successive forward and backward passages with respect to the take-off conveyor.

4. Apparatus for producing an extruded composite frozen confection product which confection comprises about 4 to 20 superimposed thin extruded layers of an aerated frozen first confection material, each of said layers having a thickness of less than about 5 millimeters and being interleaved by thin layers of a second confection material having a thickness less than about 1 millimeter, said second confection material a suspension in a fat composition of flavoring and sweetening solids, selected from the group consisting of chocolate, peanut butter, fruit and honey, said apparatus comprising a slotted extrusion means for producing at least four thin superimposed extruded layers of confection material, arranged to extrude layers having a thickness of less than about 5 mm and a take-off conveyor arranged to receive the output of the slotted extrusion means and spray nozzles arranged for spraying said second confection material between successive extruded layers.

* * * * *

UNITED STATES PATENT AND TRADEMARK OFFICE
CERTIFICATE OF CORRECTION

PATENT NO. : 4,878,425

DATED : November 7, 1989

INVENTOR(S) : Butcher et al.

It is certified that error appears in the above-identified patent and that said Letters Patent is hereby corrected as shown below:

```
First page, Item 73, after "Englewood" insert --Cliffs--;
First page, Item 56, insert after U.S. Patent Documents
--   230,431   7/1880   Ovens                 99/450.2--
--2,577,925  12/1951   Sternbach             99/450.2--
--3,405,662  10/1968   Otken                 425/131.1X--
--3,620,172  11/1971   Mueller               99/450.2--
--3,840,311  10/1974   Wight                 425/131.1--
--4,449,906   5/1984   Sienkiewicz et al.    264/171X--
Col. 1, line 8, "August 23, 1982" should read
--August 25, 1982--;
Col. 2, delete line 32;
Col. 6, line 53, after "material" insert --comprising--.
```

Signed and Sealed this

First Day of January, 1991

*Attest:*

HARRY F. MANBECK, JR.

*Attesting Officer*     *Commissioner of Patents and Trademarks*